United States Patent Office 3,436,823
Patented Apr. 8, 1969

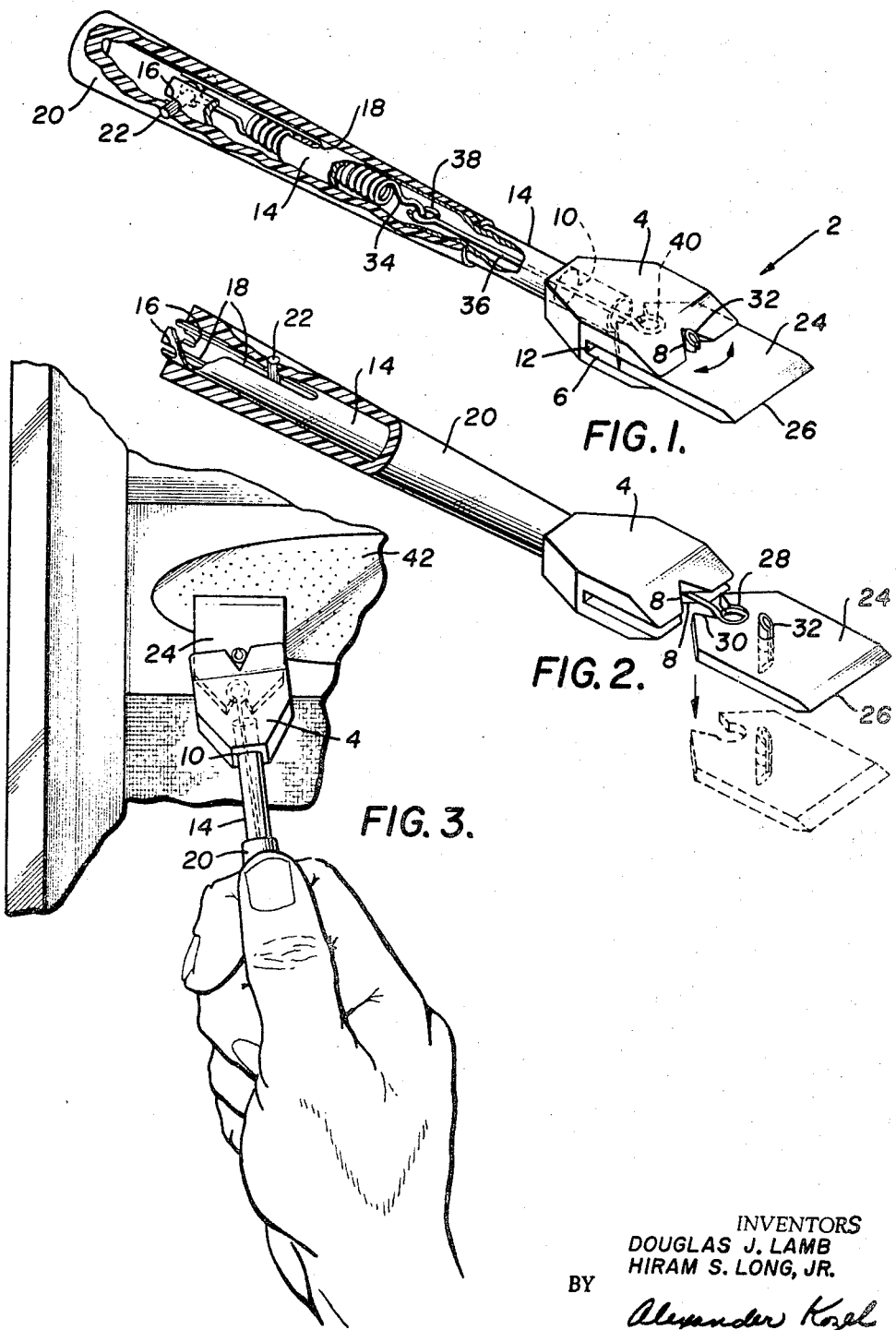

3,436,823
SPINNERETTE WIPE TOOL
Douglas J. Lamb and Hiram S. Long, Jr., Pensacola, Fla., assignors to Monsanto Company, St. Louis, Mo., a corporation of Delaware
Filed May 17, 1967, Ser. No. 639,119
Int. Cl. B26b 21/52, 5/00, 3/00
U.S. Cl. 30—169
4 Claims

ABSTRACT OF THE DISCLOSURE

A pivotal blade hand tool for wiping and cleaning flat surfaces such as spinnerette faces.

Background of the invention

In the production of synthetic yarns, polymeric materials are extruded through holes formed in spinnerettes. In use, regular wiping of spinnerette plates is required to remove polymer that has spilled and gathered on the plates. Presently, a tool called a "wipe stick" consisting of a blade fixed rigidly to handle is used for wiping purposes.

Conventional "wipe sticks" are not too serviceable and are inconvenient to handle considering the location and operating conditions surrounding a spinnerette. Spinnerettes are positioned at hard to reach ceiling levels, are cramped in quenching units where visibility is poor and are usually dripping with hot polymer. An operator in wiping a spinnerette is forced to make a quick and inaccurate swipe across the spinnerette face. Because the blade is rigidly connected to the handle, the operator depends on skill and chance to make a parallel contact of the spinnerette face with the blade of the "wipe stick." Generally, several swipes are required. With the spinnerette positioned overhead, the operator must hold the handle of the "wipe stick" in a plane perpendicular to the horizontal planar surface of the spinnerette face, otherwise, if the blade edge is not aligned with the spinnerette face, the sharp corner of the blade sometimes scores the spinnerette. Blades made of metal are commonly used because metal is suited for contacting a heated spinnerette surface and for removing heated polymer.

Summary of the invention

The hand tool comprises a head, blade and handle assembly. The blade is pivotally mounted within the head to have a radius of bilateral displacement, while being biasingly clamped within the head through a resilient connection to the handle. The handle is rotatably and reciprocably movable to one index position for retaining the blade within the head and to another index position for ejecting the blade from the head.

Brief description of the drawing

In the drawing:
FIGURE 1 is a perspective view of the novel wiping tool with segments broken away to reveal components thereof;
FIGURE 2 is a perspective view, partially in section and with a portion of the handle cut away, showing the blade in a released position; and
FIGURE 3 is a perspective view showing the use of the novel hand tool in wiping a spinnerette.

Description of the preferred embodiment

Referring to FIGURES 1–3 in the drawing, the wipe tool 2 embodying the invention includes a head 4 with a frontal inwardly extending horizontal slot 6 and with opposed notches or recesses 8 formed centrally of the opening to slot 6. Opposite slot 6 and in the horizontal plane thereof, head 4 has an inwardly extending bore or hole 10 that opens substantially centrally to the inner end of slot 6 defined by a wall 12. Preferably, all edges on the head are rounded or dulled to prevent damaging of items being wiped.

A cylindrical tube or sleeve 14 is press fit at its one end into bore 10. At its free or opposite end, sleeve 14 has opposed short index slots 16 and opposed longer index slot 18 all equally spaced and extending longitudinally thereof.

A cylindrical handle grip 20, having a bore complementary to the outside diameter of sleeve 14, is mounted slidably on the latter. A pin 22 is mounted transversely within handle grip 20 near the outer end thereof. The length of handle grip 20 from the transverse pin 22 to its inner end is shorter than the length of sleeve 14 to permit slidable back and forth movement of grip 20.

A flat blade 24 having a wiping or cutting edge 26 at the front side thereof is dimensioned to fit and slide into slot 6 in wall-to-wall relation. Opposite the wiping edge 26, there is a centrally located circumferential hole 28 with a tapered slot 30 leading thereto outwardly from the back side of the blade and convergingly inwardly forming a keyhole opening. From the ends of tapered slot 30 the back side of blade 24 is raked or tapered forwardly and laterally. Substantially centrally thereof blade 24 has a perpendicularly disposed pivot pin 32 extending therethrough with portions of the pin 32 projecting from the opposite parallel faces of blade 24.

Blade 24 is operatively connected to transverse pin 22 by a helically coiled spring 34 having hooked ends and a wire rod 36 having eyes 38 and 40 formed at its opposed ends. One hooked end of spring 34 is attached to transverse pin 22 and the opposite hooked end is attached to eye 38 of wire rod 36. Eye 40 of rod 36 is circumferential and fits slidably within the circumferential hole 28 in blade 24 in planar relation. The outwardly diverging slot 30 allows blade 24 to have limited rotational movement around eye 40.

To describe the blade loading and releasing procedure, assume that the wiping and scraping tool 2 is filled with a blade, as shown in FIG. 1, and that another blade is to be inserted. As shown in FIG. 1, pin 22 is positioned in index slots 16 and holds spring 34 in a biased position. Spring 34 applies a restraining or locking force to blade 24 through wire rod 36 by biasingly pulling blade 24 inwardly of slot 6 to a point where the opposite projecting ends of pin 32 are engaged abuttingly within respective notches 8.

To release blade 24, handle grip 20 is manually pulled back away from head 4 to a point where pin 22 is carried out of its position in index slot 16, against the force of spring 34. Grip 20 is then rotated at least a quarter turn in either direction to align pin 22 with the longer index slots 18; and, as pin 22 slides into slot 18 spring 34 pulls grip 20 slidingly toward head 4. By sliding grip 20 manually to a point where pin 22 engages the inner ends of slots 18, spring 34 and wire rod 36 are displaced rightwardly (FIG. 2). Since blade 24 is connected to wire rod 36 through hole 28 and eye 40, blade 24 is ejected from slot 6 and can readily be detached therefrom.

A new blade 24 is then attached to eye 40 and led into slot 6 (FIG. 2). The handle grip 20 is then pulled to the left (FIG. 2) a first distance to bring spring 34 to a point of tension and to position blade 24 fully within slot 6 with pivot pin 32 engaged within and abutting against the walls of notches 8. The combined length of relaxed spring 34 and rod 36 are designed so that when grip 20 is displaced the first distance referred to above, transverse pin 22 attached to spring 34 will still be positioned in the larger index slots 18. The blade 24 is then securely locked in position by pulling handle grip 20 a short distance further to the left against the force of spring 34 and to a point where transverse pin 22 is brought out of index slots 18. The handle grip 20 is then rotated a quarter turn left or right and lowered to index pin 22 within the shorter slots 16. The blade 24 is then responsively pivotable upon overcoming the resistance binding the blade 24 against pivot pin 32.

Although the procedure for releasing and loading the wipe tool 2 has been described in step detail, it will be understood that in practice the blade exchange is accomplished easily and rapidly.

A spinnerette 42 is shown in FIG. 3 being wiped with the wiping tool 2. The advantage of the pivotal blade feature is illustrated. Notwithstanding that the operator is holding the handle at an angle from a vertical plane relative to the horizontal face of the spinnerette, the blade edge 26 is aligned with the spinnerette face.

Variations and modifications of the illustrated embodiment of the invention are expected to be covered within the purview thereof. For example, the wire rod 36 may be an integral extension of spring 34; however, the spring hook and eye 38 coupling illustrated provides a preferred flexible connection that reduces the degree of turning moment that may be applied to rod 36 when handle grip 20 is rotated.

It will be understood that limitations to the invention are only contemplated within the scope of the following claims.

We claim:
1. A wiping and scraping hand tool comprising,
a head having a slot at one side, a bore opening into said slot from the opposite side thereof, and opposed notches at the entrance to said slot,
a blade having opposite flat faces, a working edge, a keyhole slot opposite said working edge, and a pivot pin projecting perpendicularly from said flat faces, said blade being slidably and pivotally mounted within said slot,
a tube mounted at one end within said bore and having opposed short and opposed long index slots at the opposite ends thereof,
a tubular grip mounted slidably on said tube and having a transverse pin at one end thereof,
resilient means connected at one end to said transverse pin,
rod means loosely coupled at one end to said resilient and slidably mated within said keyhole slot of said blade means at its opposite end,
said handle grip being reciprocable and rotatable for indexing said transverse pin into said shorter index slots to apply a biasing force to said resilient means for pivotally clamping said blade within said slot, and for indexing said transverse pin into said long index slots to release said biasing force of said resilient means for ejecting said blade from said head.

2. A wiping and scraping hand tool comprising,
handle means,
head means connected to said handle means,
blade means fulcrumed pivotally in said head means,
positionable indexing means on said handle means,
resilient means connecting said indexing means to said blade means, whereby in one position of said indexing means said blade means is held by said resilient means within said head means and in another position said resilient means ejects said blade means from said head means.

3. A wiping and scraping hand tool as in claim 2 wherein said resilient means comprises a spring.

4. A wiping and scraping hand tool comprising,
slotted head means,
blade means culcrumed to pivot arcuately within said slotted head means and having an attachment-detachment slot,
hollow handle means connected to said slotted head means,
indexing means on said hollow handle means,
spring means mounted within said hollow handle means and being connected to said indexing means and to said blade means slidable within said attachment-detachment slot,
said indexing means being biasingly movable to one position for securely holding said blade means within said head means, and to another position for ejecting said blade means from said head means permitting slidable detachment of said blade means from said spring means and slidable attachment thereto of another blade means.

References Cited

UNITED STATES PATENTS

| 1,477,653 | 12/1923 | La Barre | 30—169 X |
| 2,589,753 | 3/1952 | Vinson | 30—169 X |
| 3,224,091 | 12/1965 | Scigliano | 30—169 X |

FOREIGN PATENTS 107,127   4/1943   Sweden.

ROBERT C. RIORDON, *Primary Examiner.*

R. V. PARKER, JR., *Assistant Examiner.*

U.S. Cl. X.R.

30—335